United States Patent
Tung (10) Patent No.: US 6,968,244 B1
(45) Date of Patent: Nov. 22, 2005

(54) APPARATUS AND METHOD FOR SHARING AN AUDIO PROCESSING DEVICE BETWEEN AT LEAST TWO OPTICAL INFORMATION REPRODUCING DEVICES

(75) Inventor: Shun-Yi Tung, Taoyuan (TW)

(73) Assignee: BENQ Corporation, Taoyuan (TW)

( * ) Notice: Subject to any disclaimer, the term of this patent is extended or adjusted under 35 U.S.C. 154(b) by 942 days.

(21) Appl. No.: 09/644,134

(22) Filed: Aug. 22, 2000

(30) Foreign Application Priority Data

Sep. 10, 1999 (TW) ............................ 88115634 A (51) Int. Cl.[7] ............................................. G06F 17/00
(52) U.S. Cl. .................... 700/94; 439/638; 333/81 A
(58) Field of Search ........................ 700/94; 381/124; 710/2; 439/620, 638, 502; 174/33, 34; 333/81 A, 333/33

(56) References Cited

U.S. PATENT DOCUMENTS 5,805,030 A * 9/1998 Dhuey et al. ............. 333/81 A
5,807,140 A * 9/1998 Hopkins .................... 439/638

* cited by examiner

*Primary Examiner*—Ping Lee
(74) *Attorney, Agent, or Firm*—Birch, Stewart, Kolasch & Birch, LLP (57) ABSTRACT

The invention provides an apparatus and a method allowing N optical information reproducing devices to share an audio processing device. The apparatus includes a first connecting apparatus and (N−1) second connecting apparatuses. The first connecting apparatus corresponding to one optical information reproducing device is used to connect the corresponding optical information reproducing device to the audio processing device. Each second connecting apparatus corresponding to one optical information reproducing device is used to couple the corresponding optical information reproducing device to the first connecting apparatus. The N optical information reproducing devices are able to share the audio processing device using the apparatus of the invention without changing the hardware connection design of the audio processing device and the optical information reproducing device.

10 Claims, 6 Drawing Sheets

APPARATUS AND METHOD FOR SHARING AN AUDIO PROCESSING DEVICE BETWEEN AT LEAST TWO OPTICAL INFORMATION REPRODUCING DEVICES

FIELD OF INVENTION

The invention relates to an apparatus and a method for connecting an audio device, e.g. a sound card, with at least two optical information reproducing devices, e.g. CD-ROM, DVD-ROM, DVD-ROM, CD-RW, DVD-RAM.

BACKGROUND OF THE INVENTION

Optical information reproducing devices, including optical information recording devices, e.g. CD-ROM, DVD-ROM, CD-RW, DVD-RAM, have been widely used as the basic components within the multimedia computer systems. Typical optical reproducing devices can retrieve audio signals, i.e. the signals with audio CD format, signals with MP3 format, or audio signals with other format, recorded on the compact disc. Usually the audio signals retrieved from optical reproduction devices must be processed by audio processing devices, like a sound card, before they are transmitted to the speakers.

Figure 1A:
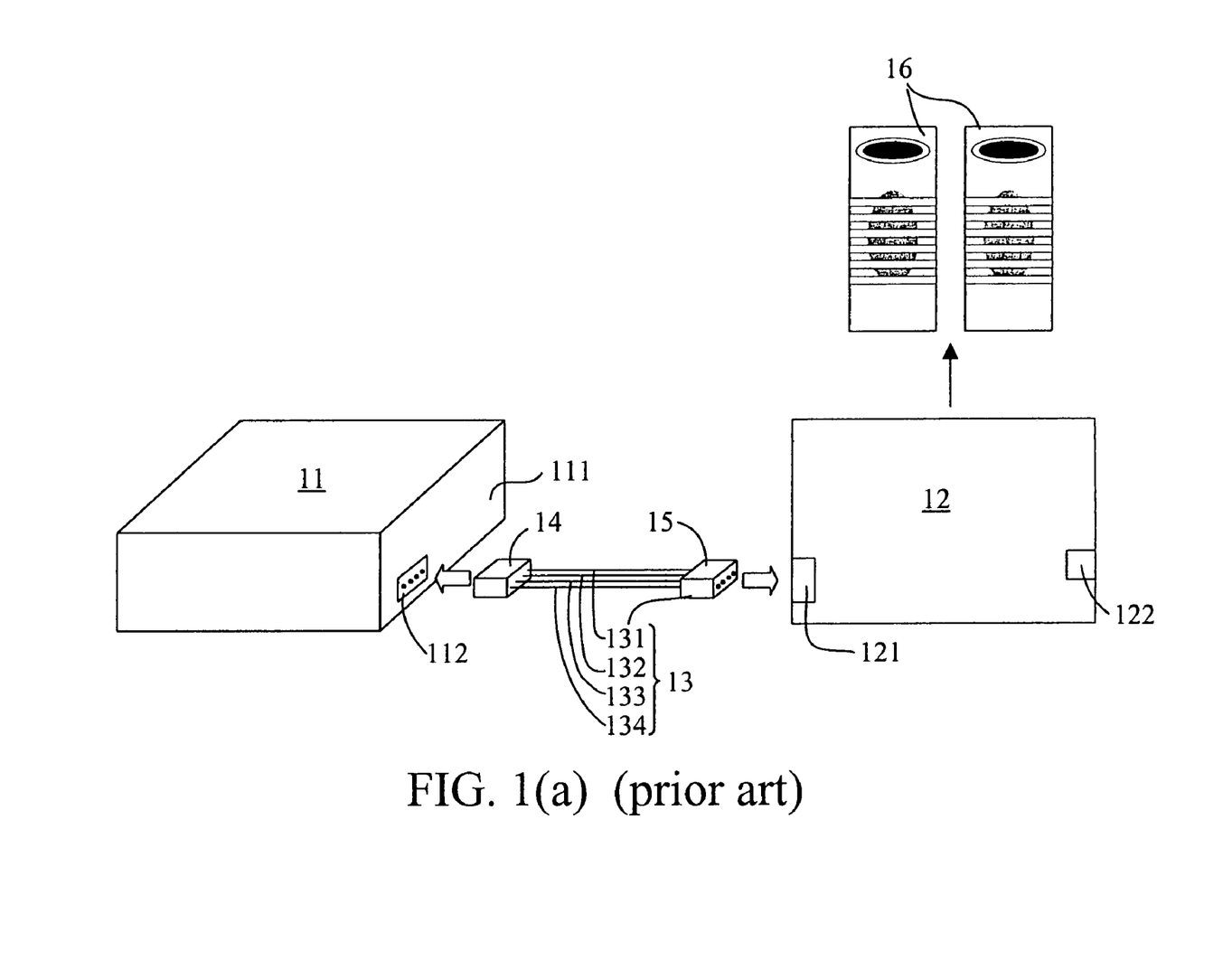
Figure 1B:
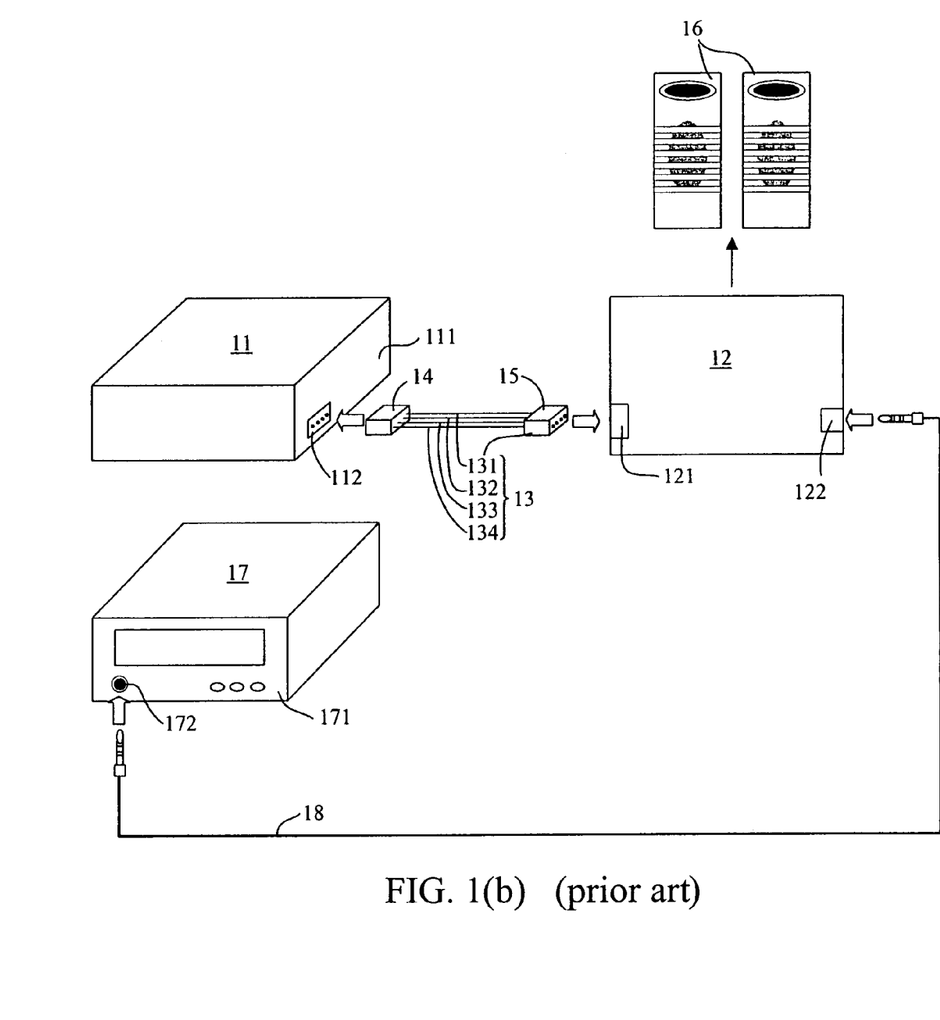

With reference to FIG. 1(a) and FIG. 1(b), the method of prior art for a sound processing device to support an optical information reproducing device will be described as follows. As shown in FIG. 1(a), a typical audio processing device 12, i.e. a sound card, includes an audio input port 121 to connect with an optical information reproducing device 11. As is conventional, the audio output port 112 of optical information reproducing device 11 is electrically connected to the audio input port 121 via a bus 13. As shown in FIG. 1(a), the bus 13 includes a connector 14 connecting to the audio output port 112 and a connector 15 connecting to the audio input port 121. While the audio output port 112 is connected to the audio input port 121 via the bus 13, the audio signals recorded on a compact disc are retrieved by the optical information reproducing device 11, output from the audio output port 112 to the audio input port 121 of the audio processing device 12 via the bus 13, processed by the audio processing device 12, and transmitted to the speakers 16. Usually, the bus 13 includes a first signal line 131 (right audio line), a first ground line 132, a second ground line 133, and a second signal line 134 (left audio line) that are used for transmitting audio signals for the left and right speakers respectively to generate stereo audio effect.

For the purpose of easy assembly with other components of a computer system, the audio output port 112 is usually provided on the back panel 111 of the optical information reproducing device 11 as shown in FIG. 1(a). In addition, the audio processing device 12, which is generally in form of an interface card, usually provides one audio input port 121. Apparently, under such arrangement, the audio processing device can only support one optical information reproducing device. While more then one optical information reproducing devices are present in the computer system and the audio processing device is expected to support all optical information reproducing devices existing, changes on hardware connection are unavoidable.

Also shown in FIG. 1 (a) is that a typical audio processing device 12 not only includes an audio input port 121 but also includes an audio input jack 122. As shown in FIG. 1(b), another optical information reproducing device 17 is able to utilize an audio signal line 18, usually an earphone line, to connect an audio input jack 172 on the front panel 171 thereof to the audio input jack 122 of the audio processing device 12. Therefore, the audio processing device 12 can support two optical information reproducing devices 11 and 17. However, this method requires a longer audio signal line and the audio signal line is located outside the computer system. Since the audio input jack 122 is located on the back side of the system while the audio output jack 172 is located on the front side of the system, inconvenience during connections of various connectors exists. Besides, the method can only support at most two optical information reproducing devices to share one audio processing device. Therefore, it is still not convenient enough for the users.

Nowadays, a computer system is often equipped with more than one optical information reproducing devices and one audio processing device. The purpose of the invention is to provide a method and an apparatus to meet the need recited above while without changing the hardware connection design of the optical information reproducing devices and the audio processing devices. By the method and the apparatus provided, at least two optical information reproducing devices can be connected to an audio processing device and share the same audio processing device. What comes with the invention is that users can selectively play an audio CD, a MP3 format CD etc. in each optical information reproducing device as they wish. Therefore, the invention provides the users with great convenience.

SUMMARY OF THE INVENTION

The invention provides a method and an apparatus for sharing an audio processing device between at least two audio reproducing apparatus. By the method and the apparatus, at least two optical reproducing devices can be connected to an audio processing device and share the audio processing device. What comes with the invention is that users can selectively play an optical disk, e.g. an audio CD, a MP3 format CD, in each optical information reproducing device. Therefore, it provides the users with great convenience.

According to a first preferred embodiment, the method provided connects one of the two optical information reproducing devices to the audio processing device via a first bus. The method further couples the other optical information reproducing device to the first bus via a second bus. The audio signals output from the optical information reproducing device connected to the first bus are transmitted to the audio processing device via the first bus. The audio signals output from the optical information reproducing device connected to the second bus are transmitted to the audio processing device via the second bus and then the first bus. Therefore, the two optical information reproducing devices can share the audio processing device.

According to a second preferred embodiment, the method provided allows to share an audio processing device between N second optical information reproducing devices and a first optical information reproducing device. The first optical information reproducing device is selectively connected to the audio processing device via a first bus and N is a positive integer number. The method provides N second buses and electrically connects each of the N second buses to one corresponding second optical reproducing device. The method further couples each second bus to the first bus. The audio signals output by the first optical information reproducing device are transmitted to the audio processing device via the first bus. The audio signals of each second optical information reproducing device that connects to a second bus are transmitted to the audio processing device via the connected second bus and then the first bus. Therefore, the first optical information reproducing device is able to share the audio processing device with the N second optical information reproducing devices.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTIONS OF THE DRAWINGS

The present invention will become more fully understood from the detailed description given hereinbelow and the accompanying drawings, which are given by way of illustration only, and thus are not limitative of the present invention, and wherein:

FIG. 1(*a*) shows an audio processing device 12 supporting an optical information reproduction device 11 according to one prior art approach.

FIG. 1(*b*) shows an audio processing device 12 supporting two optical information reproduction devices 11, 17 according to another prior art approach.

FIG. 2(*a*) shows an apparatus 20 of the first preferred embodiment of the invention.

FIG. 2(*b*) is a variant of the apparatus 20 shown in FIG. 2(*a*).

DETAILED DESCRIPTIONS OF THE INVENTION

The First Preferred Embodiment

A detailed description of implementations according to the first preferred embodiment will be given as follows.

Figure 2A:
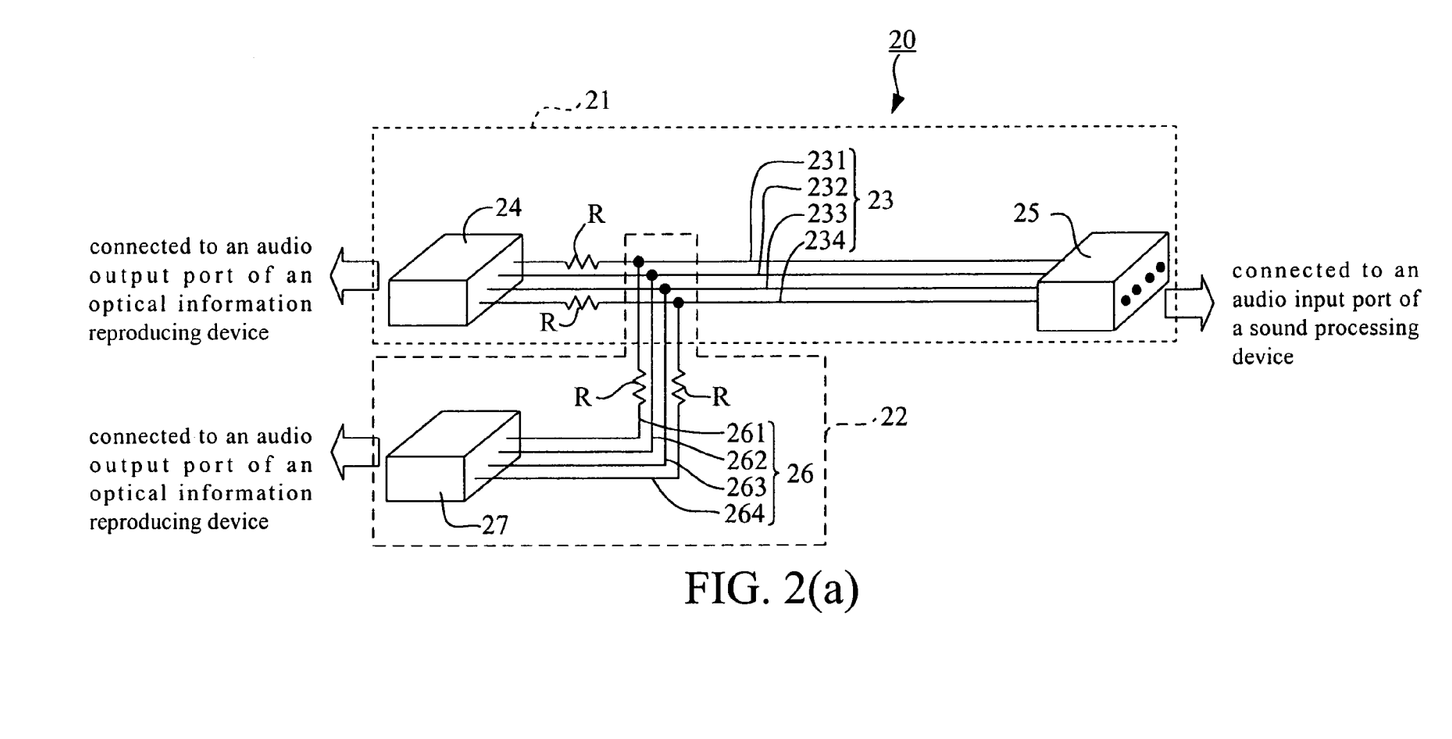

As shown in FIG. 2 (*a*), an apparatus 20 provided by the invention allows two optical information reproducing devices (not shown in FIG. 2(*a*)) to share an audio processing device (not shown in FIG. 2(*a*)). The apparatus 20 includes a first connecting apparatus 21 and a second connecting apparatus 22. The first connecting apparatus 21 connects one of the two optical information reproducing devices to the audio processing device. The second connecting device 22 couples the other optical information reproducing device to the connecting apparatus 21.

Each of the optical information reproducing devices above mentioned, e.g. CD-ROM, DVD-ROM, DVD-ROM, CD-RW, DVD-RAM, etc., respectively includes an audio output port. The first and the second connecting apparatuses (21, 22) both include first connectors (24, 27) that are connected to the audio output port of the two optical information reproducing devices in a well known manner. As well known in the arts that the audio processing device, e.g. a sound card, includes an audio input port. The first connecting apparatus 21 further includes a second connector 25 for the connection to the audio input port of the audio processing device. The first and the second connecting apparatuses (21, 22) respectively includes buses (23, 26), and the second connecting apparatus 22 is coupled to the bus 23 of the first connecting apparatus 21 via the bus 26.

The bus 23 of the first connecting apparatus 21 includes a first signal line 231, a first ground line 232, a second ground line 233, and a second signal line 234. The bus 26 includes a first signal line 261, a first ground line 262, a second ground line 263, and a second signal line 264. The first signal line 261, the first ground line 262, the second ground line 263, and the second signal line 264 are respectively coupled to the first signal line 231, the first ground line 232, the second ground line 233, and the second signal line 234.

Alternatively, serially-connected resistors R are respectively provided on the first signal lines (231, 261) and the second signal lines (234, 264). Each R is located between the corresponding first connector and the coupling node, and impedance of the resistor R is far smaller than the impedance of the audio input port.

Figure 2B:
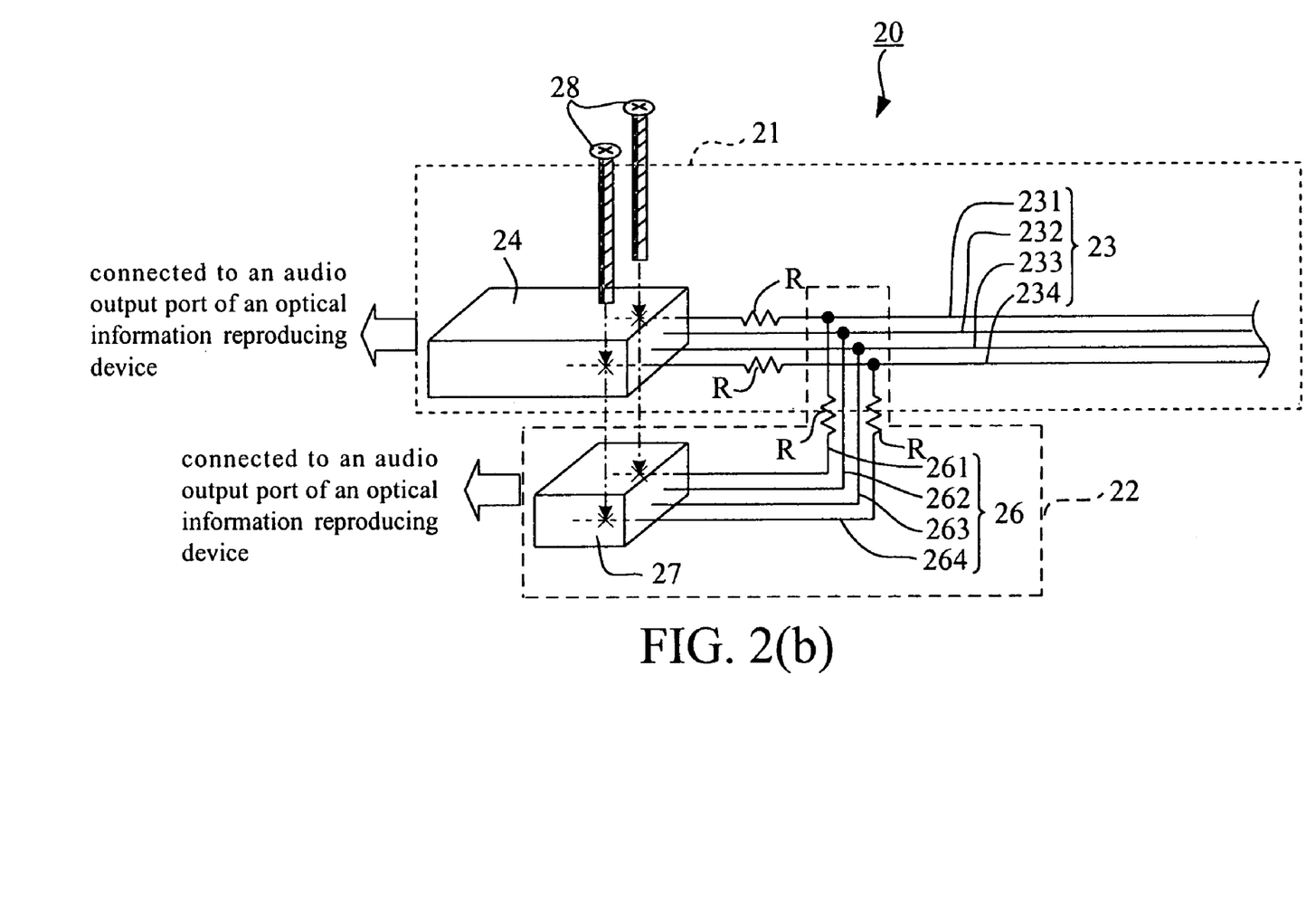

As shown in FIG. 2 (*b*), the apparatus 20 provided has same essential components as those shown in FIG. 2(*a*). The elements in FIG. 2(*b*) and FIG. 2(*a*) that bearing the same numeral indication respectively perform same function and will be not repeatedly recited for brevity purpose. The apparatus 20 shown is able to connect two optical information reproducing devices (not shown in FIG. 2(*b*)) to an audio processing device (not shown in FIG. 2(*b*)) and allows two optical information reproducing devices to share same audio processing device.

The major difference of the apparatus 20 shown in FIG. 2 (*b*) from the apparatus 20 shown in FIG. 2 (*a*) resides on the length of the first connector 24 is longer than the second connector 27. In addition, two first connectors (24, 27) can be connected together by the bolt 28. Therefore, while only one optical information reproducing device and one audio processing device are provided in a computer system, two first connectors (24, 27) are connected together and the longer connector 24 is used to connect to the audio output port of the single optical information reproducing devices. Particularly, as two first connectors (24, 27) are connected together by the bolt 28, the bolt 28 contacts with the first signal line 231, the first signal line 261, and contacts with the second signal line 234 and the second signal line 264 at the point marked with "X". As a result, the signal line 231 is coupled to the signal line 261 at the "X" location and the signal line 234 is coupled to the signal line 264 at the "X" location. Therefore, as the apparatus 20 is connected to a single optical information reproducing device, the impedance thereof is decreased due to the coupling between two first signals lines (231, 261), and the coupling between two second signal lines (234, 264). Therefore, the audio signals transmitted by the apparatus 20 experience less signal attenuation.

The Second Preferred Embodiment

A detailed description of implementations according to the second preferred embodiment will be given as follows.

Figure 3:
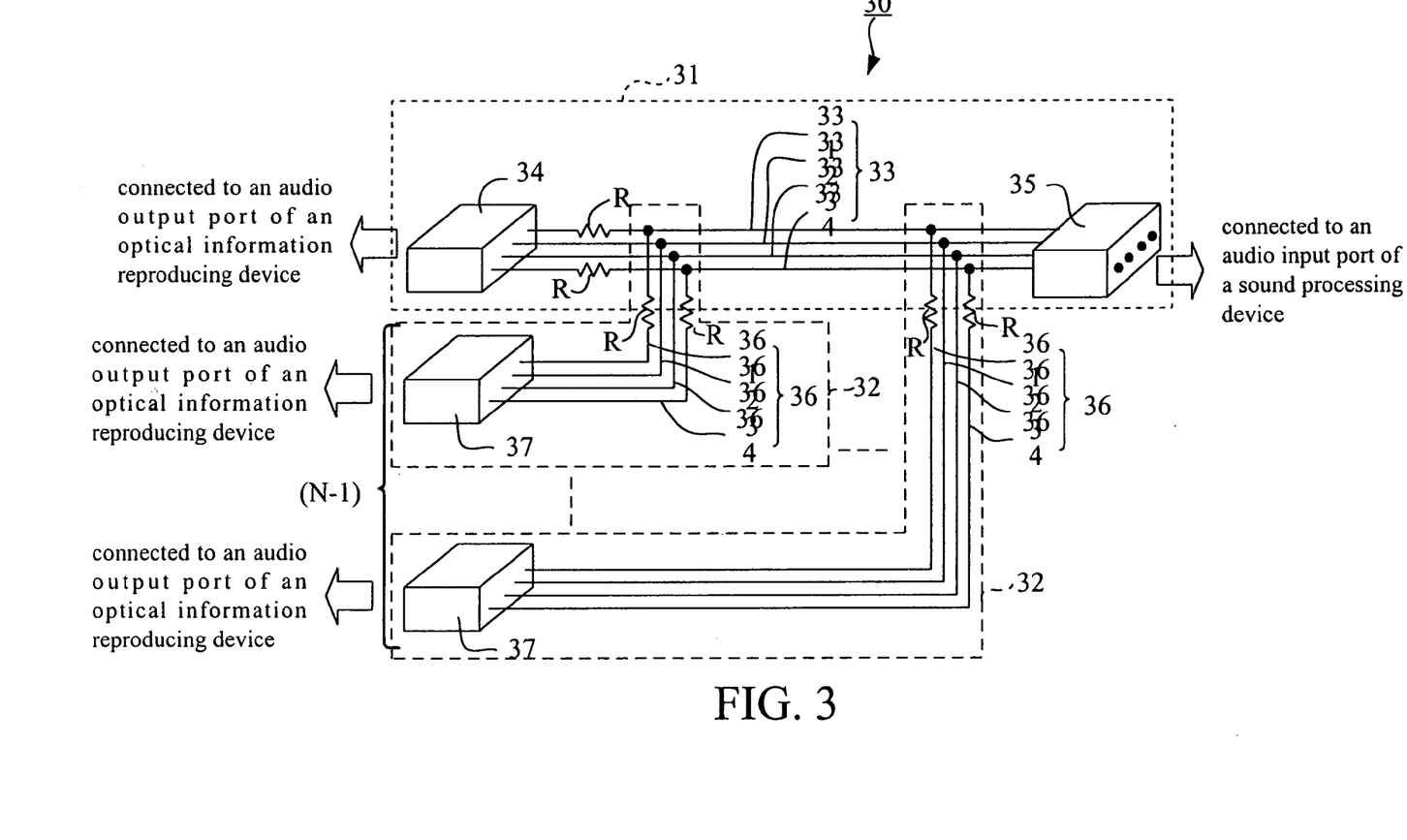
FIG. 3 shows the second preferred embodiment of the invention.

As shown in FIG. 3, an apparatus 30 provided by the invention allows N (an integer equal or larger than 2) optical information reproducing devices (not shown in FIG. 3) to share an audio processing device (not shown in FIG. 3). The apparatus 30 includes a first connecting apparatus 31 and (N−1) second connecting apparatuses 32. The first connecting apparatus 31 corresponds to one optical information reproducing device and connects the corresponding optical information reproducing device with the audio processing device. Each second connecting apparatuses 32 corresponds to one optical information reproducing device and couples one corresponding optical information reproducing device to the first connecting apparatus 31.

Each of the N optical information reproducing devices is a typical optical information reproducing device that includes an audio output port. The first and second connecting apparatuses (31, 32) respectively include first connectors (34, 37) that are respectively connected to audio output ports of the corresponding optical information reproducing devices in a well known manner. As well known in the arts that the audio processing device, e.g. a sound card, includes an audio input port. The first connecting apparatus 31 further includes a second connector 35 for the connection to the audio input port of the audio processing device. The first connecting apparatus 31 includes a bus 33, and each second connecting apparatus 32 includes a bus 36. Each bus 36 is connected to the bus 33 of the first connecting apparatus 31.

The bus 33 of the first connecting apparatus 31 includes a first signal line 331, a first ground line 332, a second ground line 333, and a second signal line 334. The bus 36 includes a first signal line 361, a first ground line 362, a second ground line 363, and a second signal line 364. The first signal line 361, the first ground line 362, the second ground line 363, and the second signal line 364 are respectively coupled to the first signal line 331, the first ground line 332, the second ground line 333, and the second signal line 334.

Alternatively, a serially-connected resistor R is respectively provided on each of the first signal lines (331, 361) and the second signal lines (334, 364). Each R is located between the corresponding first connector and the coupling node and the impedance of the resistor R is far smaller than the impedance of the audio input port.

Figure 4:
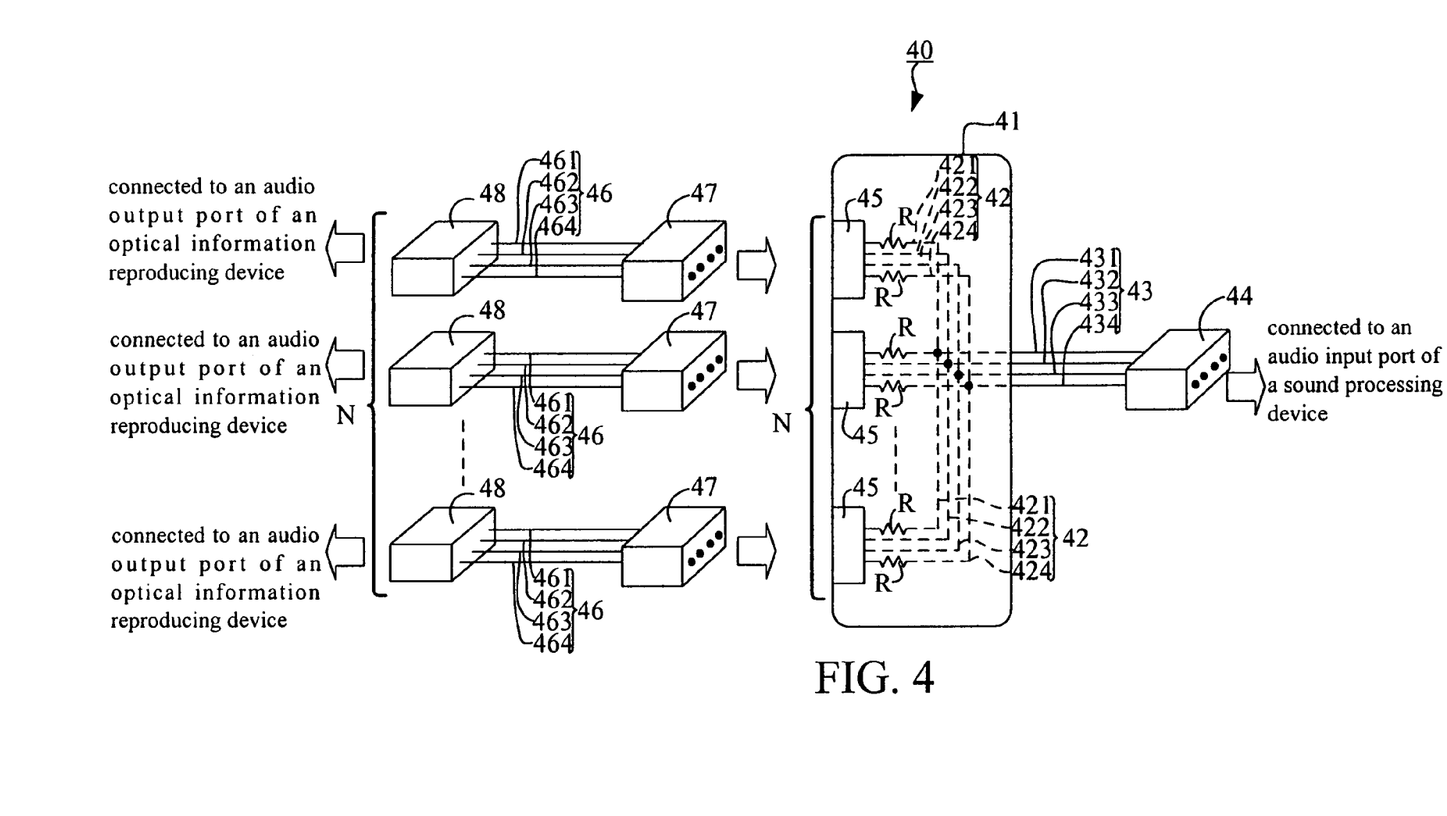
FIG. 4 shows a variant of the second preferred embodiment of the invention.

As shown in FIG. 4, an apparatus 40 provided by the invention allows an audio processing device (not shown in FIG. 4) to connect with N (an integer equal or larger than 2) optical information reproducing devices (not shown in FIG. 4). The apparatus 40 includes a connecting apparatus 41. The connecting apparatus 41 is provided with a first bus 43 for connecting the apparatus 41 to the audio processing device. The connecting apparatus 41 also includes N connecting ports 45 each of which is respectively coupled to the first bus 43 by a second bus 42. The apparatus 40 further includes N third buses 46 each of which is able to be selectively connected to one corresponding connecting port 45 via a connector 47. As each of third buses 46 is respectively connected to a corresponding connecting port 45 of the connecting apparatus 41, the third bus 46 is used for connecting the connecting apparatus 41 to one optical information reproducing device. Therefore, the N optical information reproducing devices are able to share the audio processing device by the apparatus 40.

The first bus 43 includes a first connector 44 for the connection to the audio input port of the audio processing device. Each optical information reproducing device is a typical optical information reproducing device that includes an audio output port. Each third bus 46 includes a second connector 48 for the connection to the audio output port of the corresponding optical information reproducing device, and each third bus 46 includes a third connector 47 for the connection to the corresponding connecting port 45 of the connecting apparatus 41.

The first bus 43 includes a first signal line 431, a first ground line 432, a second ground line 433, and a second signal line 434. Each second bus 42 includes a first signal line 421, a first ground line 422, a second ground line 423, and a second signal line 424. Each third bus 46 includes a first signal line 461, a first ground line 462, a second ground line 463, and a second signal line 464. Within the connecting apparatus 41, each first signal line 421, each first ground line 422, each second ground line 423, and each second signal line 424 are respectively coupled to the first signal line 431, the first ground line 432, the second ground line 433, and the second signal line 434. As a third bus 46 is connected to one connecting port 45, the corresponding first signal line 461, the first ground line 462, the second ground line 463, and the second signal line 464 of the third bus 46 are respectively connected to the first signal line 421, the first ground line 422, the second ground line 423, and the second signal line 424.

Alternatively, a serially-connected resistor R is respectively provided on each of the first and second signal lines (421, 424). The impedance of the resistor R is far smaller than the impedance of the audio input port of the audio processing device. In an alternative embodiment not shown, each of the first and the second signal lines (461, 464) are provided respectively with serially-connected resistors R which are far smaller than the impedance of the audio input port of the audio processing device.

In a preferred embodiment, the connecting apparatus 41 is implemented as a printed circuit board. In another embodiment, the connecting apparatus 41 is implemented as one in a hub form or a router form.

It is apparent that the method or the apparatus of the invention does not involve change with respect to the hardware design of optical information reproducing device and audio processing device. The invention does allow at least two optical information reproducing devices to share single audio processing device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of sharing an audio processing device between two optical information reproducing devices comprising the steps of:
   coupling one of the two optical information reproducing devices to the audio processing device via a first bus;
   coupling the other one of the two optical information reproducing devices to the first bus by a second bus; wherein each of the first bus and the second bus respectively comprises a first signal line, a second signal line, a first ground line and a second ground line; and
   respectively providing a serially-connected resistor over the first signal line and the second signal line of each of the first bus and the second bus;
   wherein the coupling step of the second bus to the first bus is performed by respectively coupling the first signal line, the second signal line, the first ground line, and the second ground line of the second bus to the first signal line, the second signal line, the first ground line, and the second ground line of the first bus.

2. The method as set forth in claim 1, wherein each resistor is located between the optical information reproducing device and a coupling node.

3. The method as set forth in claim 2, wherein the audio processing device comprises an audio input port connecting with the first bus and the resistor has an impedance substantially smaller than an impedance of the audio input port.

4. An apparatus for use in allowing two optical information reproducing devices to share an audio processing device, comprising:
   a first connecting apparatus for coupling one of the two optical information reproducing devices to the audio processing device; and
   a second connecting apparatus for coupling the other one of the two optical information reproducing devices to the first connecting apparatus, wherein the first and the second connecting apparatus respectively comprise a first bus and a second bus, and the second bus of the second connecting apparatus is coupled to the first bus of the first connecting apparatus;
   wherein each of the first bus and the second bus respectively comprises a first signal line, a second signal line, a first ground line and a second ground line, and wherein a serially-connected resistor is respectively provided over the first and the second signal lines of the first and the second connecting apparatuses.

5. The apparatus as set forth in claim 4, wherein each of the two optical information reproducing devices respectively comprises an audio output port and each of the first and second connecting apparatuses respectively comprises a first connector connecting to an audio output port of one corresponding optical information reproducing device.

6. The apparatus as set forth in claim 4, wherein the audio processing device comprises an audio input port and the first connecting apparatus comprises a second connector connecting to the audio input port of the audio processing device.

7. The apparatus as set forth in claim 4, wherein the first signal line, the second signal line, the first ground line, and the second ground line of the second connecting apparatus are respectively coupled to the first signal line, the second signal line, the first ground line, and the second ground line of the first connecting apparatus.

8. The apparatus as set forth in claim 7, wherein each resistor is located between the optical information reproducing device and a coupling node.

9. The apparatus as set forth in claim 8, wherein the resistor has an impedance substantially smaller than an impedance of the audio input port.

10. An apparatus for use in allowing two optical information reproducing devices to share an audio processing device, comprising:
   a first connecting apparatus for coupling one of the two optical information reproducing devices to the audio processing device; and
   a second connecting apparatus for coupling the other one of the two optical information reproducing devices to the first connecting apparatus, wherein the first and the second connecting apparatus respectively comprise a first bus and a second bus, and the second bus of the second connecting apparatus is coupled to the first bus of the first connecting apparatus;
   wherein each of the first bus and the second bus respectively comprises a first signal line, a second signal line, a first ground line and a second ground line, and wherein a serially-connected resistor is respectively provided over the first and the second signal lines of the first and the second connecting apparatuses, and wherein the first connector of the first connecting apparatus has a length longer than a length of the first connector of the second connecting apparatus, the first connector of the first connecting apparatus is selectively coupled with the first connector of the second connecting apparatus, and as the first connector of the first connecting apparatus and the first connector of the second connecting apparatus are connected to each other, the first and the second signal lines of the second connecting apparatus are respectively coupled to the first and the second signal lines of the first connecting apparatus.

* * * * *